United States Patent
Wang et al.

(10) Patent No.: US 11,115,479 B2
(45) Date of Patent: Sep. 7, 2021

(54) ENHANCED ONLINE PRIVACY

(71) Applicant: Google LLC, Mountain View, CA (US)

(72) Inventors: Yuewei Wang, Mountain View, CA (US); Shashank Chaudhary, Mountain View, CA (US); Onur Soysal, Mountain View, CA (US); Michael Ortega-Binderberger, Berkeley, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/245,048

(22) Filed: Jan. 10, 2019

(65) Prior Publication Data

US 2020/0228604 A1     Jul. 16, 2020

(51) Int. Cl.

| | |
|---|---|
| *H04L 29/08* | (2006.01) |
| *G06F 21/31* | (2013.01) |
| *H04L 29/06* | (2006.01) |
| *H04N 7/167* | (2011.01) |
| *G06F 9/445* | (2018.01) |
| *H04L 12/24* | (2006.01) |
| *H04L 12/06* | (2006.01) |

(52) U.S. Cl.
CPC .............. *H04L 67/14* (2013.01); *G06F 21/31* (2013.01); *H04L 63/10* (2013.01); *H04L 67/02* (2013.01)

(58) Field of Classification Search
CPC ......... H04L 67/14; H04L 67/02; H04L 63/10; G06F 21/31
USPC ....................................................... 709/227
See application file for complete search history.

(56) References Cited

U.S. PATENT DOCUMENTS

| | | | | |
|---|---|---|---|---|
| 8,843,514 | B1* | 9/2014 | Moonka | G06F 16/95 |
| | | | | 707/769 |
| 9,514,446 | B1* | 12/2016 | Rajkumar | H04L 9/0861 |
| 9,607,105 | B1* | 3/2017 | Dass | G06F 16/3331 |
| 9,710,567 | B1* | 7/2017 | Lobdell | H04L 65/403 |

(Continued)

OTHER PUBLICATIONS

PCT International Search Report and Written Opinion in International Application No. PCT/US2019/064690, dated Mar. 13, 2020, 15 pages.

(Continued)

*Primary Examiner* — David R Lazaro
*Assistant Examiner* — Berhanu Shitayewoldetadik
(74) *Attorney, Agent, or Firm* — Fish & Richardson P.C.

(57) ABSTRACT

Methods, systems, and apparatus, including computer programs encoded on a computer storage medium, for enhancing online user privacy. Methods can include receiving tag information specifying a given publisher identifier for a publisher and a given client identifier assigned to a user of the client device by the publisher. A given service identifier assigned to the user by the service apparatus is obtained. A mapping between the given service identifier to the given client identifier is created. A list of client identifiers assigned to a set of users by the publisher is received. A list of matched service identifiers corresponding to the list of client identifiers are stored. Multiple content requests are received from multiple different client devices accessing services provided by the service apparatus. Responses to the content requests are based on whether the client devices provide service identifiers that are included in the list of matched service identifiers.

20 Claims, 5 Drawing Sheets

(56) References Cited

U.S. PATENT DOCUMENTS

| | | | | |
|---|---|---|---|---|
| 2001/0020904 A1* | 9/2001 | Dayle | G06F 9/453 | 341/21 |
| 2003/0149581 A1* | 8/2003 | Chaudhri | G06Q 30/06 | 709/203 |
| 2005/0010794 A1* | 1/2005 | Carpentier | G06F 16/137 | 713/193 |
| 2006/0195914 A1* | 8/2006 | Schwartz | G06F 21/645 | 726/32 |
| 2006/0224406 A1* | 10/2006 | Leon | H04L 67/42 | 705/26.1 |
| 2007/0067409 A1* | 3/2007 | Eslambolchi | H04L 63/10 | 709/217 |
| 2008/0222283 A1* | 9/2008 | Ertugrul | G06Q 30/02 | 709/224 |
| 2009/0083155 A1* | 3/2009 | Tudor | G06Q 30/0273 | 705/14.69 |
| 2009/0083442 A1* | 3/2009 | Sutter | H04L 67/142 | 709/248 |
| 2009/0234731 A1* | 9/2009 | Mariotti | G06Q 30/0267 | 705/14.1 |
| 2009/0298480 A1* | 12/2009 | Khambete | G06F 16/335 | 455/414.1 |
| 2010/0131373 A1* | 5/2010 | Kubasov | G06Q 30/02 | 705/14.73 |
| 2010/0211960 A1* | 8/2010 | Sirajuddin | G06F 16/9535 | 719/313 |
| 2010/0268840 A1* | 10/2010 | Hiie | H04L 67/104 | 709/231 |
| 2011/0246297 A1 | 10/2011 | Buchalter et al. | | |
| 2011/0320529 A1* | 12/2011 | Mentchoukov | G06F 3/04847 | 709/203 |
| 2012/0173746 A1* | 7/2012 | Salinger | H04N 21/64322 | 709/230 |
| 2012/0215621 A1* | 8/2012 | Heffernan | G06Q 30/0201 | 705/14.41 |
| 2012/0233256 A1* | 9/2012 | Shaham | G06Q 30/02 | 709/204 |
| 2013/0013428 A1* | 1/2013 | Lyon | G06Q 30/06 | 705/14.73 |
| 2013/0073382 A1* | 3/2013 | Henkin | G06F 16/955 | 705/14.49 |
| 2013/0086603 A1* | 4/2013 | Kruger | G06F 16/9535 | 725/14 |
| 2013/0145022 A1* | 6/2013 | Srivastava | G06F 16/48 | 709/224 |
| 2013/0238745 A1* | 9/2013 | Ramachandran | H04N 21/2396 | 709/217 |
| 2013/0246560 A1* | 9/2013 | Feng | H04L 29/06 | 709/217 |
| 2013/0290369 A1* | 10/2013 | Sayers | G06F 16/954 | 707/769 |
| 2013/0332604 A1* | 12/2013 | Seth | H04L 67/22 | 709/224 |
| 2014/0019424 A1* | 1/2014 | Goh | G06F 16/958 | 707/690 |
| 2014/0149506 A1* | 5/2014 | Yuan | H04L 67/02 | 709/204 |
| 2014/0172999 A1* | 6/2014 | Morris | G06Q 10/107 | 709/206 |
| 2014/0278948 A1* | 9/2014 | Lemphers | G06Q 30/0273 | 705/14.49 |
| 2014/0278950 A1* | 9/2014 | Lemphers | G06Q 30/0239 | 705/14.49 |
| 2015/0100660 A1* | 4/2015 | Flack | H04L 67/1095 | 709/213 |
| 2015/0193828 A1* | 7/2015 | Bulger | G06Q 30/0269 | 705/14.66 |
| 2015/0309971 A1* | 10/2015 | Cowley | H04L 67/02 | 715/234 |
| 2015/0324947 A1* | 11/2015 | Winograd | G06F 16/9566 | 382/100 |
| 2016/0057237 A1* | 2/2016 | Yang | H04L 67/16 | 709/224 |
| 2016/0077897 A1* | 3/2016 | Tsang | G06F 9/547 | 719/328 |
| 2016/0119283 A1* | 4/2016 | Ptalis | G06Q 10/06 | 709/223 |
| 2016/0154539 A1* | 6/2016 | Buddhiraja | H04L 63/10 | 715/738 |
| 2016/0196245 A1* | 7/2016 | Cook | G06F 16/957 | 715/234 |
| 2016/0203522 A1* | 7/2016 | Shiffert | G06Q 30/0267 | 705/14.58 |
| 2016/0232538 A1* | 8/2016 | Papakostas | G06F 16/48 | |
| 2016/0364771 A1* | 12/2016 | Nielsen | H04L 67/02 | |
| 2017/0006032 A1* | 1/2017 | Simpson | H04W 4/21 | |
| 2017/0026381 A1* | 1/2017 | Wesseling | G06F 21/56 | |
| 2017/0063969 A1* | 3/2017 | Franks | G06Q 30/0277 | |
| 2017/0188232 A1* | 6/2017 | Raleigh | H04W 12/069 | |
| 2017/0193566 A1* | 7/2017 | Lucash | G06F 3/0485 | |
| 2017/0272485 A1* | 9/2017 | Gordon | H04L 65/601 | |
| 2017/0353516 A1* | 12/2017 | Gordon | H04L 67/10 | |
| 2018/0007120 A1* | 1/2018 | Yan | H04L 67/306 | |
| 2018/0246983 A1* | 8/2018 | Rathod | G06F 16/9535 | |
| 2019/0205430 A1* | 7/2019 | Huang | G06F 16/489 | |
| 2019/0261222 A1* | 8/2019 | Raleigh | H04L 63/105 | |
| 2020/0034864 A1* | 1/2020 | Faith | G06Q 30/0225 | |

OTHER PUBLICATIONS

KR Office Action in Korean Appln. No. 10-2020-7020110, dated Mar. 26, 2021, 10 pages (with English translation).

\* cited by examiner

ENHANCED ONLINE PRIVACY

BACKGROUND

This specification relates to data processing and enhancing online privacy.

The Internet facilitates the exchange of information and transactions between users across the globe. This exchange of information enables distribution of content to a variety of users. In some situations, content from multiple different providers can be integrated into a single electronic document to create a composite document. For example, a portion of the content included in the electronic document may be selected (or specified) by a publisher of the electronic document. A different portion of content (e.g., digital component) can be provided by a third-party (e.g., an entity that is not a publisher of the electronic document and/or does not have access to modify code defining the electronic document). In some situations, the digital component is selected for integration with the electronic document after presentation of the electronic document has already been requested. For example, machine executable instructions included in the electronic document can be executed by a client device when the electronic document is rendered at the client device, and the instructions can enable the client device to contact one or more remote servers to obtain a digital component that will be integrated into the electronic document at the client device.

SUMMARY

In general, one innovative aspect of the subject matter described in this specification can be embodied in methods including the operations of receiving, by a service apparatus and from a client device, tag information in a network call to the service apparatus that was generated by firing of a tag embedded in a resource of a publisher, the tag information specifying a given publisher identifier for the publisher and a given client identifier assigned to a user of the client device by the publisher; obtaining, from the client device, a given service identifier assigned to the user by the service apparatus; creating, by the service apparatus and in a data structure, a mapping the given service identifier to the given client identifier; receiving, from the publisher and by way of an API, a list of client identifiers assigned to a set of users by the publisher; determining that the list of client identifiers includes the given client identifier that is mapped to the given service identifier; storing, by the service apparatus, the given service identifier that is mapped to the given client identifier in a list of matched service identifiers based on the determination; receiving, by the service apparatus, multiple content requests from multiple different client devices accessing services provided by the service apparatus; responding to the content requests based on whether the client devices provide service identifiers that are included in the list of matched service identifiers, including: transmitting first content reserved for the list of matched service identifiers when the client device provides a corresponding service identifier that is included in the list of matched service identifiers; transmitting second content that is not reserved for the list of matched service identifiers when the client device does not provide the corresponding service identifier that is included in the list of matched service identifiers. Other embodiments of this aspect include corresponding systems, devices, apparatus, and computer programs configured to perform the actions of the methods. The computer programs (e.g., instructions) can be encoded on computer storage devices. These and other embodiments can each optionally include one or more of the following features.

Methods can include the actions of generating a hash representation of the user, including: combining the given publisher identifier and the given client identifier; and generating a hash of the combination of the publisher identifier and the given client identifier. Creating a mapping the given service identifier to the given client identifier can include mapping the hash representation of the user to the given service identifier.

Methods can further include the actions of determining that the user is logged into a given service provided by the service apparatus; identifying an account identifier for the user based on the service that the user is logged into; identifying, using the account identifiers, a different service identifier that is assigned to the user for a different service provided by the service apparatus; and creating a different mapping between the given client identifier and the different service identifier.

Creating a mapping the given service identifier to the given client identifier can include creating a mapping of the given service identifier to a first hash value created using the given client identifier and a first hash function or seed. Creating a different mapping between the given client identifier and the different service identifier can include creating a mapping of the different service identifier to a second hash value created using the given client identifier and a second hash function or seed, wherein the second hash value differs from the first hash value.

Methods can include the actions of receiving, from a different client device, the tag information and a different service identifier; deleting, from the data structure, the mapping of the given service identifier to the given client identifier; and creating, in the data structure, a different mapping of the different service identifier to the given client identifier.

Storing the given service identifier that is mapped to the given client identifier in a list of matched service identifiers can include storing the given service identifier in a data structure entry with a set of publisher identifier-content pairs that specify publisher identifiers of publisher lists that include the given client identifier and user-specific content that is to be distributed to users in the publisher lists.

Methods can include the actions of updating the list of matched service identifiers in response to determining that the user has been assigned the different service identifier, including remapping, to the different identifier, existing associations between the given service identifier and the set of publisher identifier-content pairs.

Methods can include the actions of, after storing the given service identifier that is mapped to the given client identifier in a list of mapped service identifiers, deleting the given client identifier.

Transmitting first content reserved for the list of matched service identifiers when the client device provides a corresponding service identifier that is included in the list of mapped service identifiers can include presenting the first content while the user is accessing a service provided in a different second level domain than a domain of the publisher.

Particular embodiments of the subject matter described in this specification can be implemented so as to realize one or more of the following advantages. For example, the innovations discussed herein maintain user privacy while facilitating the ability to provide user-specific information across multiple different services, domains, and entities. More specifically, publishers can specify a list of users that they want provided specific information when those users access third-party services, without specifically identifying those users. Furthermore, the technology described herein enables the specific information to be provided to the specified list of users within a computing environment that does not allow for access to publisher cookies by the third-party services. For example, the information can be used to serve the specific information in content provided by a third-party provider, and also enables the service provider to select content for presentation to the users on the list in other web pages or applications (e.g., provided by the publisher).

Unlike conventional identifier mapping techniques (e.g., cookie mapping techniques), the mapping referred to in the techniques discussed throughout this document is used to generate a list of service identifiers corresponding to users that have been selected to receive the user-specific information so that the mapping between the client identifiers and the service identifiers does not need to be used at the time content is being requested for presentation in the third-party services. When content is requested, the use of the list of service identifiers, rather than the mapping, reduces the latency of the system, for example, because the system can do a direct look-up using the list of service identifiers included in the list to determine whether the user-specific information should be provided, rather than having to first identify the service identifier in the mapping, then identify the client identifier that is mapped to the service identifier, and then determine whether the identified client identifier is included in a list of client identifiers corresponding to users that are to receive the user-specific information. Aggregated across millions/billions of requests, this results in a substantial reduction in processor time required to service the requests.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
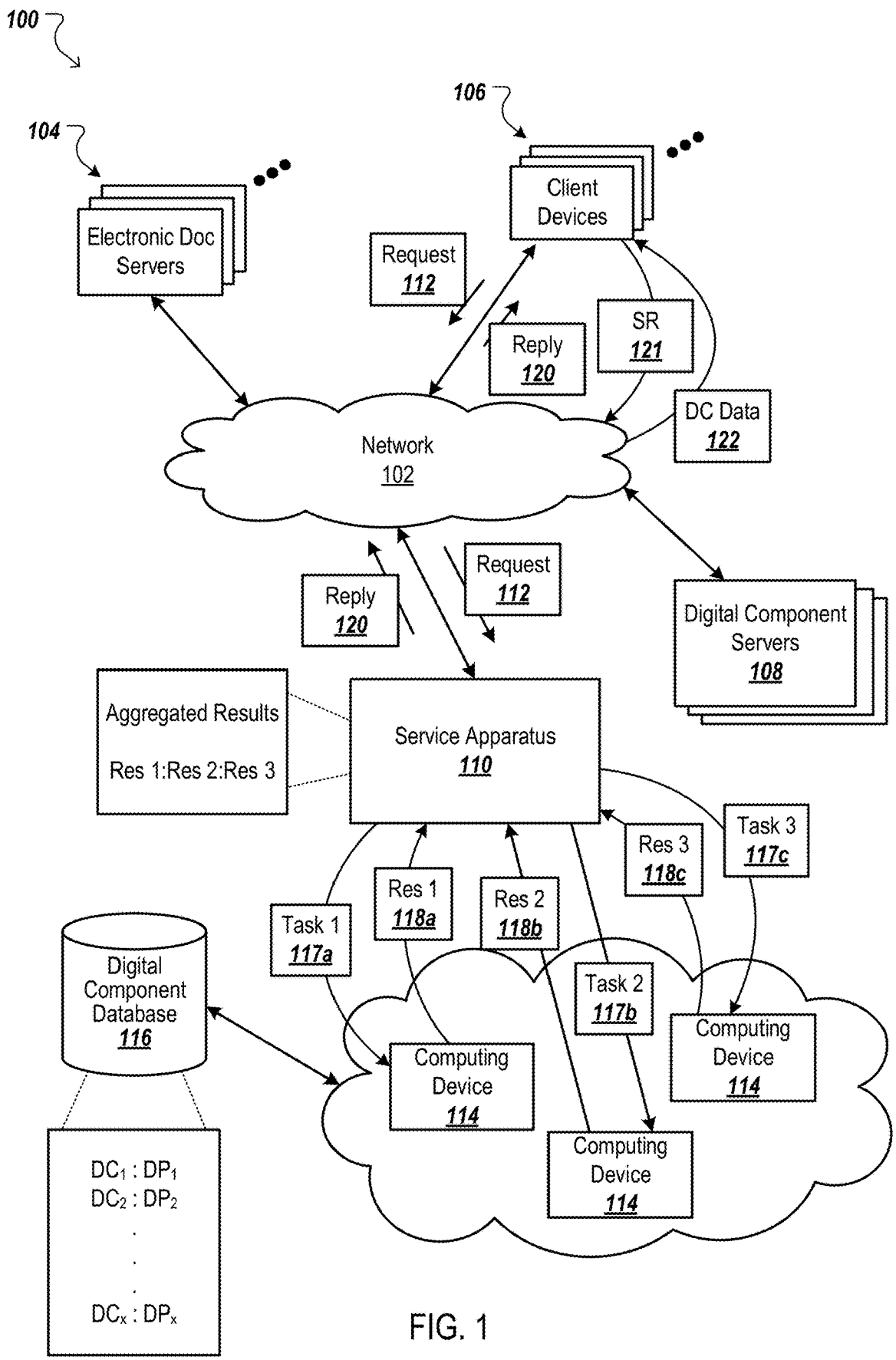
FIG. 1 is a block diagram of an example environment in which digital components are distributed for presentation with electronic documents.

This document discloses methods, systems, apparatus, and computer readable media that maintain user privacy while facilitating the ability to provide user-specific information across multiple different services and entities. More specifically, publishers (e.g., owners or operators of web pages or online applications) can specify a list of users that they want provided specific information when those users access a variety of third-party services hosted by a different online domain than the publisher's resources (e.g., that differ from the web pages or online applications provided by the publisher), without specifically identifying those users.

As described in more detail below, the service apparatus can facilitate the distribution of user-specific information specified by publishers to users of third-party services based on a mapping of service identifiers maintained by the service apparatus to client identifiers that were assigned to the users by the publishers. The mapping of service identifiers to client identifiers can be generated by the service apparatus. In some implementations, the service apparatus obtains client identifiers assigned to users in a set of tag information that is submitted to the service apparatus when a pixel within the publisher's resource is executed by the client device (e.g., browser executing at the client device). The tag firing at the client device initiates a network call to the service apparatus and informs the service apparatus of the client identifier that was assigned to by the publisher as well as an identifier of the publisher. When the call is made to the service apparatus (e.g., a domain of the service apparatus), the client device (e.g., the browser executing at the client device) will also submit a service identifier that was assigned by the service apparatus, and is stored at the client device. Using this combination of information, the service apparatus can map the client identifier assigned to a given user by the publisher to the service identifier that was assigned to that user by the service apparatus.

Meanwhile, the publisher can submit (e.g., by way of an application programming interface "API" of the service apparatus) a list of client identifiers that the publisher has elected to receive user-specific information. The service apparatus uses the mapping that was created to transform the list of client identifiers into a corresponding list of service identifiers that does not include the client identifiers that represent the users in the publisher's domain, but still represents those same users (e.g., those represented by the list of client identifiers) in the domain of the service apparatus. When the service apparatus receives a request for content from a user accessing third-party services in the domain of the service apparatus, those requests will include a service identifier that represents a user in the domain of the service apparatus. The received service identifier can then be compared to the list of service identifiers that represent the user that the publisher has elected to receive user-specific information. When the service apparatus identifies a match between the received service identifier and the list, the service apparatus can transmit the user-specific information in response to the request. When the service apparatus fails to identify a match between the received service identifier and the list, the service apparatus refrains from transmitting the user-specific information, but may still transmit other information in response to the request.

FIG. 1 is a block diagram of an example environment 100 in which digital components are distributed for presentation with electronic documents. The example environment 100 includes a network 102, such as a local area network (LAN), a wide area network (WAN), the Internet, or a combination thereof. The network 102 connects electronic document servers 104, user devices 106, digital component servers 108, and a service apparatus 110. The example environment 100 may include many different electronic document servers 104, user devices 106, and digital component servers 108.

A client device 106 is an electronic device that is capable of requesting and receiving resources over the network 102. Example client devices 106 include personal computers, mobile communication devices, digital assistant devices, and other devices that can send and receive data over the network 102. A client device 106 typically includes a user application, such as a web browser, to facilitate the sending and receiving of data over the network 102, but native applications executed by the client device 106 can also facilitate the sending and receiving of data over the network 102.

Digital assistant devices include devices that include a microphone and a speaker. Digital assistant devices are generally capable of receiving input by way of voice, and respond with content using audible feedback, and can present other audible information. In some situations, digital assistant devices also include a visual display or are in communication with a visual display (e.g., by way of a wireless or wired connection). Feedback or other information can also be provided visually when a visual display is present. In some situations, digital assistant devices can also control other devices, such as lights, locks, cameras, climate control devices, alarm systems, and other devices that are registered with the digital assistant device.

An electronic document is data that presents a set of content at a client device 106. Examples of electronic documents include webpages, word processing documents, portable document format (PDF) documents, images, videos, search results pages, and feed sources. Native applications (e.g., "apps"), such as applications installed on mobile, tablet, or desktop computing devices are also examples of electronic documents. Electronic documents can be provided to client devices 106 by electronic document servers 104 ("Electronic Doc Servers"). For example, the electronic document servers 104 can include servers that host publisher websites. In this example, the client device 106 can initiate a request for a given publisher webpage, and the electronic server 104 that hosts the given publisher webpage can respond to the request by sending machine executable instructions that initiate presentation of the given webpage at the client device 106.

In another example, the electronic document servers 104 can include app servers from which client devices 106 can download apps. In this example, the client device 106 can download files required to install an app at the client device 106, and then execute the downloaded app locally.

Electronic documents can include a variety of content. For example, an electronic document can include static content (e.g., text or other specified content) that is within the electronic document itself and/or does not change over time. Electronic documents can also include dynamic content that may change over time or on a per-request basis. For example, a publisher of a given electronic document can maintain a data source that is used to populate portions of the electronic document. In this example, the given electronic document can include a script that causes the client device 106 to request content from the data source when the given electronic document is processed (e.g., rendered or executed) by a client device 106. The client device 106 integrates the content obtained from the data source into the given electronic document to create a composite electronic document including the content obtained from the data source.

In some situations, a given electronic document can include a digital component script that references the service apparatus 110, or a particular service provided by the service apparatus 110. In these situations, the digital component script is executed by the client device 106 when the given electronic document is processed by the client device 106. Execution of the digital component script configures the client device 106 to generate a request for digital components 112 (referred to as a "component request"), which is transmitted over the network 102 to the service apparatus 110. For example, the digital component script can enable the client device 106 to generate a packetized data request including a header and payload data. The component request 112 can include event data specifying features such as a name (or network location) of a server from which the digital component is being requested, a name (or network location) of the requesting device (e.g., the client device 106), and/or information that the service apparatus 110 can use to select one or more digital components, or other content, provided in response to the request. The component request 112 is transmitted, by the client device 106, over the network 102 (e.g., a telecommunications network) to a server of the service apparatus 110.

The component request 112 can include event data specifying other event features, such as the electronic document being requested and characteristics of locations of the electronic document at which digital component can be presented. For example, event data specifying a reference (e.g., URL) to an electronic document (e.g., webpage) in which the digital component will be presented, available locations of the electronic documents that are available to present digital components, sizes of the available locations, and/or media types that are eligible for presentation in the locations can be provided to the service apparatus 110. Similarly, event data specifying keywords associated with the electronic document ("document keywords") or entities (e.g., people, places, or things) that are referenced by the electronic document can also be included in the component request 112 (e.g., as payload data) and provided to the service apparatus 110 to facilitate identification of digital components that are eligible for presentation with the electronic document. The event data can also include a search query that was submitted from the client device 106 to obtain a search results page.

Component requests 112 can also include event data related to other information, such as information that a user of the client device has provided, geographic information indicating a state or region from which the component request was submitted, or other information that provides context for the environment in which the digital component will be displayed (e.g., a time of day of the component request, a day of the week of the component request, a type of device at which the digital component will be displayed, such as a mobile device or tablet device). Component requests 112 can be transmitted, for example, over a packetized network, and the component requests 112 themselves can be formatted as packetized data having a header and payload data. The header can specify a destination of the packet and the payload data can include any of the information discussed above.

The service apparatus 110 chooses digital components (e.g., video files, audio files, images, text, and combinations thereof, which can all take the form of advertising content or non-advertising content) that will be presented with the given electronic document in response to receiving the component request 112 and/or using information included in the component request 112. In some implementations, a digital component is selected in less than a second to avoid errors that could be caused by delayed selection of the digital component. For example, delays in providing digital components in response to a component request 112 can result in page load errors at the client device 106 or cause portions of the electronic document to remain unpopulated even after other portions of the electronic document are presented at the client device 106. Also, as the delay in providing the digital component to the client device 106 increases, it is more likely that the electronic document will no longer be presented at the client device 106 when the digital component is delivered to the client device 106, thereby negatively impacting a user's experience with the electronic document. Further, delays in providing the digital component can result in a failed delivery of the digital component, for example, if the electronic document is no longer presented at the client device 106 when the digital component is provided.

In some implementations, the service apparatus 110 is implemented in a distributed computing system that includes, for example, a server and a set of multiple computing devices 114 that are interconnected and identify and distribute digital component in response to requests 112. The set of multiple computing devices 114 operate together to identify a set of digital components that are eligible to be presented in the electronic document from among a corpus of millions of available digital components ($DC_{1-x}$). The millions of available digital components can be indexed, for example, in a digital component database 116. Each digital component index entry can reference the corresponding digital component and/or include distribution parameters ($DP_1$-$DP_x$) that contribute to (e.g., trigger, condition, or limit) the distribution/transmission of the corresponding digital component. For example, the distribution parameters can contribute to (e.g., trigger) the transmission of a digital component by requiring that a component request include at least one criterion that matches (e.g., either exactly or with some pre-specified level of similarity) one of the distribution parameters of the digital component.

In some implementations, the distribution parameters for a particular digital component can include distribution keywords that must be matched (e.g., by electronic documents, document keywords, or terms specified in the component request 112) in order for the digital component to be eligible for presentation. The distribution parameters can also require that the component request 112 include information specifying a particular geographic region (e.g., country or state) and/or information specifying that the component request 112 originated at a particular type of client device (e.g., mobile device or tablet device) in order for the digital component to be eligible for presentation. The distribution parameters can also specify an eligibility value (e.g., bid, ranking score, or some other specified value) that is used for evaluating the eligibility of the digital component for distribution/transmission (e.g., among other available digital components), as discussed in more detail below.

The identification of the eligible digital component can be segmented into multiple tasks 117a-117c that are then assigned among computing devices within the set of multiple computing devices 114. For example, different computing devices in the set 114 can each analyze a different portion of the digital component database 116 to identify various digital components having distribution parameters that match information included in the component request 112. In some implementations, each given computing device in the set 114 can analyze a different data dimension (or set of dimensions) and pass (e.g., transmit) results (Res 1-Res 3) 118a-118c of the analysis back to the service apparatus 110. For example, the results 118a-118c provided by each of the computing devices in the set 114 may identify a subset of digital components that are eligible for distribution in response to the component request and/or a subset of the digital component that have certain distribution parameters. The identification of the subset of digital components can include, for example, comparing the event data to the distribution parameters, and identifying the subset of digital components having distribution parameters that match at least some features of the event data.

The service apparatus 110 aggregates the results 118a-118c received from the set of multiple computing devices 114 and uses information associated with the aggregated results to select one or more digital components that will be provided in response to the request 112. For example, the service apparatus 110 can select a set of winning digital components (one or more digital components) based on the outcome of one or more content evaluation processes, as discussed below. In turn, the service apparatus 110 can generate and transmit, over the network 102, reply data 120 (e.g., digital data representing a reply) that enable the client device 106 to integrate the set of winning digital components into the given electronic document, such that the set of winning digital components and the content of the electronic document are presented together at a display of the client device 106.

In some implementations, the client device 106 executes instructions included in the reply data 120, which configures and enables the client device 106 to obtain the set of winning digital component from one or more digital component servers. For example, the instructions in the reply data 120 can include a network location (e.g., a Uniform Resource Locator (URL)) and a script that causes the client device 106 to transmit a server request (SR) 121 to the digital component server 108 to obtain a given winning digital component from the digital component server 108. In response to the request, the digital component server 108 will identify the given winning digital component specified in the server request 121 (e.g., within a database storing multiple digital components) and transmit, to the client device 106, digital component data (DC Data) 122 that presents the given winning digital component in the electronic document at the client device 106.

The service apparatus 110 can utilize various techniques to evaluate the eligibility of various different digital components that are available to be transmitted in response to a given component request (e.g., an individual component request). For example, the service apparatus 110 can compare eligibility values of the various different digital components and select one or more of the digital components having the highest eligibility values as the digital components that will be transmitted to the client device 106 in response to the given component request. In some situations, an initial eligibility value (e.g., bid or other value) of each digital component can be specified by a provider (or source) of the digital component. For example, one provider (P1) of a video clip (VC1) can provide an initial eligibility value of 1.0, and a different provider (P2) of a different video clip (VC2) can provide an initial eligibility value of 1.1. For purposes of this example, assume that the component request is only requesting one digital component to be presented with a particular web page. To select which of the two video clips will be provided, the service apparatus 110 can rank VC1 and VC2 based on their respective initial eligibility values and select the highest ranked video clip to be transmitted to the client device in response to the component request. In this example, VC2 would be ranked higher than VC1 because the initial eligibility value of 1.1 for VC2 is higher than the initial eligibility value of 1.0 for VC1.

In some situations, the eligibility of the various different digital components can be evaluated using only the initial eligibility values submitted by the providers (sources) of the digital components. In other situations, the initial eligibility values submitted by the providers are augmented (or varied)

based on one or more other factors. For example, the service apparatus 110 can generate an adjusted eligibility value for a digital component based on the initial eligibility value of that digital component and a quality factor for the digital component.

The quality factor for a given digital component can quantify the likelihood that the given digital component is an appropriate digital component to be provided in response to a given component request. In some implementations, the quality factor is determined based on one or more features specified by the event data. More specifically, the service apparatus 110 can input one or more features from the event data (e.g., geographic information and/or terms from the electronic document) into a machine learning system that outputs a predicted distribution outcome, which can be used as the quality factor. The predicted distribution outcome can be expressed, for example, as a predicted interaction rate (e.g., click-through-rate, play-through-rate, or another measure of interaction with a digital component) for the digital component in the context of the present component request.

Once the quality factor has been obtained, it can be applied to the initial eligibility value to arrive at an adjusted eligibility value. For example, the adjusted eligibility value (AEV) can be a product of the initial eligibility value and the quality factor (e.g., AEV=quality factor*initial eligibility value). In some situations, the adjusted eligibility values of the various different digital components can be used to rank the digital components (e.g., from highest to lowest), and one or more of the highest ranking digital components can be selecting to be transmitted in response to the component request.

In some situations, the selection of digital components can also be based on whether a user has been selected to receive user-specific information. As used throughout this document, user-specific information refers to information (e.g., including digital components) that has been specified for distribution to one or more users that are included in a specific list of users. For example, user-specific information includes, but it not limited to, specific digital components that have been specified for distribution to a list of users submitted by a publisher of a website, application, or other resource. The list of users that are elected to receive/be provided the users on the list can be generated in various ways, but in some situations, the list is generated based on the users having performed some specific online activity (e.g., visiting a specific page of a website, reaching a specified level within an application—such as a gaming application, requesting specific information (e.g., using a digital assistant device), watching a specific video, or other activities. More specifically, the publisher can identify the users that performed the specific activity, create a list of user identifiers representing those users, and provide that list of user identifiers to the service apparatus 110 along with an indication of the user-specific information that is to be provided to the users in the list.

Restrictions on user identifiers limits the ability of the service apparatus 110 to use the list of user identifiers provided by the publisher. For example, cookies, which usually contain the user identifiers, are generally only accessible by apparatus (e.g., servers or other computing devices) that are hosted in a domain matching the domain of the cookie. That is, when a cookie is placed on a client device 106 by an electronic document server 104 in the domain example.com, that cookie will generally only be available to the browser or native applications running on a client device when that client device accesses network locations (e.g., web pages) within example.com. As such, servers that provide content in the domain of example.com will only have access to the cookies for the domain of example.com. As such, any user identifiers stored in the example.com cookie will not be available to apparatus (e.g., servers or other computing devices) in other domains. Similarly, information, including user identifiers assigned by an apparatus that serves electronic documents in a different domain (e.g., other than example.com), stored in cookies placed on the client device 106 generally will not be accessible to the electronic document server 104 in the example.com domain. As such, the service apparatus 110 generally cannot directly use the list of identifiers assigned to users by publishers to facilitate the distribution of user-specific information across domains.

Cookie mappings can help facilitate the distribution of user-specific information across domains (and cookie spaces), but absent processes to protect user privacy, the use of cookie mappings can lead to data leakage (e.g., dissemination of user information), and/or the aggregation of users from multiple different cookies provided by multiple different entities. Cookie mappings alone can also lead to higher response latency because of the lookup process associated with cookie mappings. The discussion that follows provides details of techniques that can be used to enhance user privacy, while facilitating the distribution, by a service apparatus, of user-specific information to users specified by publishers (e.g., entities that operate and/or maintain the electronic document servers 104) that publish content in a domain that differs from that of the service apparatus. The techniques also provide for lower response latency than conventional cookie mappings because the cookie mapping is not needed at serving time.

Note that the techniques described herein can be used in any situation in which access to user identifiers are limited. For example, even if access to user identifiers assigned in one domain were generally accessible to an apparatus (e.g., a service apparatus) that serves HTTP requests for web pages/services in a different domain, the techniques described herein can be used in situations where the separation of user identifiers is desired or unavoidable (e.g., to improve user privacy).

This document refers to a service apparatus. As used herein, a service apparatus is one or more data processing apparatus that perform operations to facilitate the distribution of content over a network. The service apparatus is depicted as a single block in block diagrams. However, while the service apparatus could be a single device or single set of devices, this disclosure contemplates that the service apparatus could also be a group of devices, or even multiple different systems that communicate in order to provide various content to client devices. For example, the service apparatus could encompass one or more of a search system, a video streaming service, an audio streaming service, an email service, a navigation service, an advertising service, or any other service.

Figure 2A:
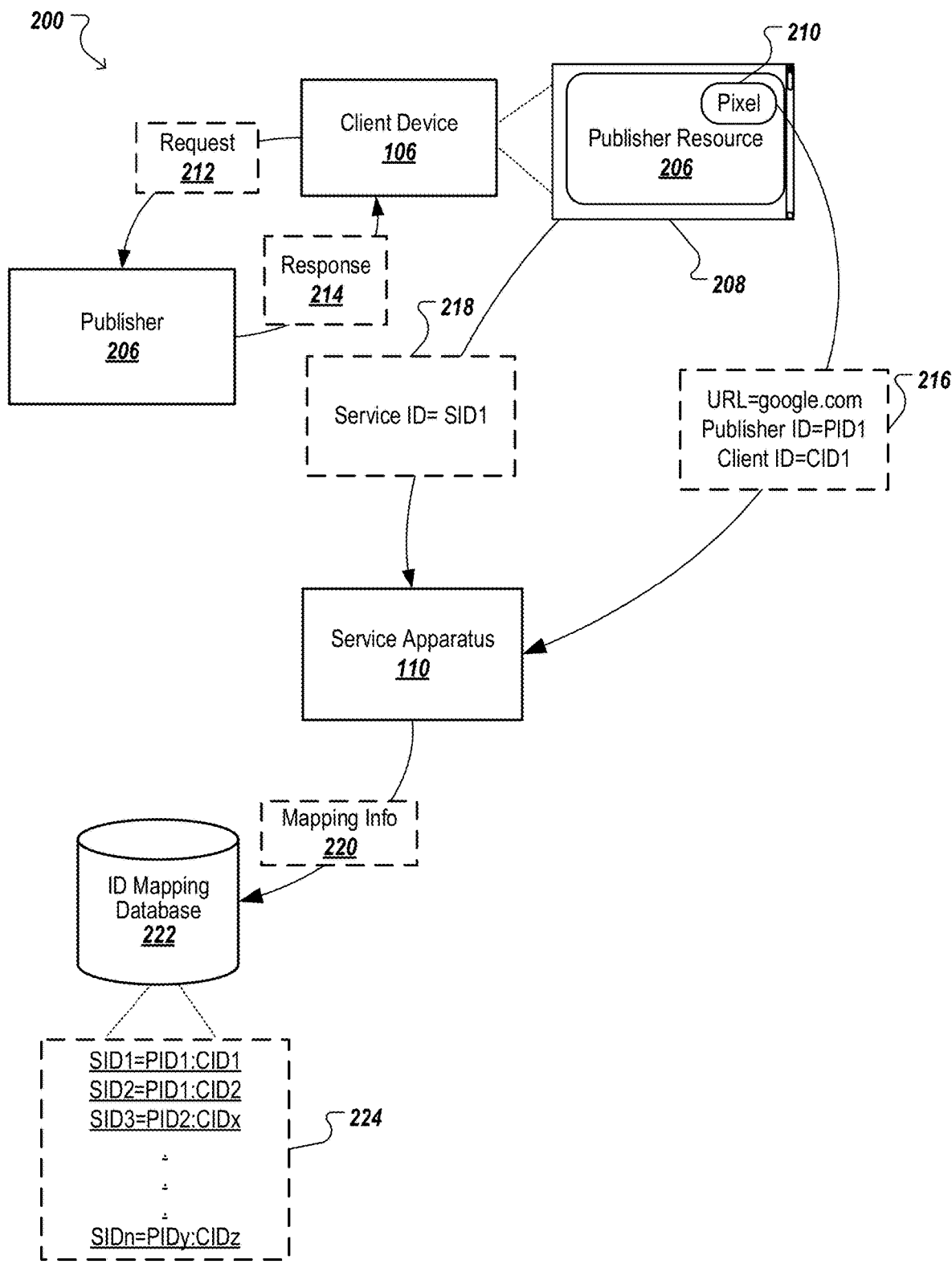
FIG. 2A is a block diagram illustrating an example technique for creating an identifier mapping.

FIG. 2A is a block diagram 200 illustrating an example technique for creating an identifier mapping 224. The identifier mapping 250 maps a service identifier ("SID") that is assigned to a user by a service apparatus 110 (or an additional apparatus) to a client identifier ("CID") that is assigned to the user by a publisher 206. The publisher 206 can be the owner, operator, and/or administrator of a publisher resource. In some implementations, the publisher resource 206 is in a different domain (e.g., a different fully qualified domain or different second level domain) than documents and/or services of the service apparatus 110. For example, the publisher resource 206 can be in the example- .com domain, whereas the documents and/or services provided by the service apparatus 110 are not in the example-.com domain. In a specific example, the service apparatus 110 may serve HTTP requests for documents and/or services in the google.com domain, while the publisher resource 206 can be in a different domain (e.g., other than google.com).

Client identifiers assigned to the user by the publisher, and stored on the client device 106, may only be accessible by devices (e.g., servers) that reside in the example.com domain, meaning that the service apparatus 110 will not have access to those identifiers that have been assigned to the user by the publisher and stored on the client device 106. More specifically, when a client device 106 accesses a given network location (e.g., a URL) using a browser 208 (or native application) the browser generally will not provide a cookie (or other file) that originated from a different domain than the domain of the web page/service being served from the given network location. As such, when the client device 106 accesses the service apparatus 110 using the browser 208 (or a native application), any cookies dropped on the client device 106 from a domain that differs from the domain of the documents and/or services being provided by service apparatus 110 will not be provided to the service apparatus 110. Therefore, any client identifiers that were assigned to the user by the publisher 206 and stored at the client device 106 (e.g., in a publisher cookie) will not be passed to the service apparatus 110 by the browser 208.

The publisher 206 can cause the client device 106 to transmit information from the publisher's cookie (e.g., any cookie dropped on the client device from the publisher's domain) to the service apparatus 110 using a tag, which is referred to as a pixel 210, for purposes of example, that is embedded in the publisher's properties (e.g., web pages and/or native applications). The pixel 210 can be a 1×1 pixel (or another pixel, script or other tag) that is embedded into a publisher resource 206. When the client device 106 submits a request 212 for the publisher resource 206, the request is received by one of the publisher's servers, and a response including the publisher resource 206 is transmitted to the client device 106. As the client device 106 renders the publisher resource 206 within the browser 208, the client device will encounter the pixel 210. Execution of the pixel 210 by the client device 106 (e.g., using the browser 208) triggers a network call 216 to the service apparatus 110 (e.g., to a URL of the service apparatus 110).

The pixel 210 can be configured to embed the client identifier (e.g., "CID1") for the user into the network call 216. The pixel 210 can also be configured to embed additional information, such as an identifier for the publisher (e.g., "PID1), into the network call 216. For example, when the client device 106 requests the publisher resource 206 using the browser 208, the browser 208 can pass the publisher's cookie, which is stored at the client device 106, to the publisher's server. The publisher server can embed this information into the pixel 210 so that when the client device 106 executes the pixel 210, the embedded information will be included in the network call 216 that is passed to the service apparatus 110. In this way, the service apparatus 110 is enabled to obtain any client identifiers that have been assigned to the user even though the browser 208 may not provide those client identifiers to the service apparatus 110 as part of a regular network call to the service apparatus 110 (e.g., initiated by a user entering a URL of the service apparatus 110 into the browser 208).

When the pixel 210 initiates the network call 216 to the service apparatus 110, the information embedded in the pixel 210 generally will not include any service identifiers (e.g., SID1) that have been assigned to the user by the service apparatus 110. This is because when the client device 106 requests the publisher resource 206, the browser 208 will not pass a cookie dropped on the client device 106 to the publisher servers for the reasons discussed above (e.g., different and/or non-matching domains between the publisher server and the cookie). However, when the pixel 210 generates the network call 216 to the service apparatus 110, that network call 216 will be directed to the domain of the service apparatus 110 (e.g., google.com), such that the browser 208 will transmit a cookie 218 of the service apparatus 110 (e.g., having a same domain as the service apparatus 110) to the service apparatus 110. The cookie 218 that is transmitted to the service apparatus 110 will include a service identifier (e.g., "SID1") that was assigned to the user by the service apparatus 110 (or another device within the same domain as the service apparatus 110). Thus, when the pixel 210 fires, the client device 106 will transmit the service identifier assigned to the user by the service apparatus 110, as well as the client identifier assigned to the user by the publisher, to the service apparatus 110.

The example above refers to using a pixel to transmit a service identifier and a client identifier to the service apparatus 110. In some implementations, the service identifier and client identifier can be transmitted by the client device 106 to the service apparatus 110 using a script (e.g., JavaScript) that is embedded in the publisher resource 206. The script can be for example, a script provided by the service provider that owns/operates the service apparatus 110. When the browser 208 encounters the script, the browser 208 will execute the script, which causes the browser 208 to send an HTTP request, including the service identifier and/or client identifier, to the service apparatus 110. In some implementations, the script causes the browser 208 to access one or more cookies having a same domain as the HTTP request to the service apparatus 110, and provide the cookie and/or information from the cookie to the service apparatus 110. In this way, a script can be used to transmit the service identifier and the client identifier to the service apparatus 110.

Note that client identifiers may not be stored on the client device, but rather generated based on other user specific information that may be stored on the client device 106, included in HTTP request parameters or included in a dynamic HTTP response generated by the publisher server when the client device 106 accesses electronic documents and/or services provided by the publisher. When the pixel or script is executed by the browser 208, these types of client identifiers can also be obtained by the browser 208 and transmitted to the service apparatus 110. Scripts and/or other executable instructions that are embedded in a resource of a publisher are also referred to as tags, and the information provided based on the execution of these scripts and/or other executable instructions are collectively referred to as tag information.

The service apparatus 110 receives both of the client identifier and the service identifier, and generates mapping information 220 indicating that the service identifier and the client identifier are both assigned to and/or represent a same user. For example, the mapping information can be a set of data that is arranged in a way that enables the service apparatus 110 to use either of the service identifier or the client identifier to obtain the other corresponding identifier that represents the same user. For example, the mapping information can simply be formatted as a key value pair indicating that the service identifier and the client identifier represent the same user.

One way in which user privacy is enhanced by the present innovation is by the way in which the mappings of client identifiers to service identifiers are created and stored. For example, rather than simply storing a direct mapping of the client identifier assigned by the publisher to the service identifier assigned by the service apparatus 110, the service apparatus 110 can generate a hash of the client identifier that is mapped to the service identifier. This limits the ability for the client identifier of the user to be revealed. Furthermore, to prevent the possibility of linking two different client identifiers to the same user (e.g., by way of the same client identifier being assigned to the same user by two different publishers), the service apparatus 110 can join the publisher identifier with the client identifier prior to the hashing.

For example, assume that publisher with the identifier PID1 assigned a particular user the client identifier CID1, and that a different publisher with the identifier PID2 also assigned that same particular user the client identifier CID1. In this example, the mapping of the client identifier for the first publisher can be, for example, SID1=hash(PID1:CID1), while the mapping for the second publisher can be SID1=hash(PID2:CID1), thereby resulting in different mappings across the different publishers.

The service apparatus 110 can store the mapping information 220 in the ID mapping database 222. For example, each entry in the ID mapping database 222 can correspond to a pair of service identifiers and client identifiers that represent the same user. In other words, each entry can specify a mapping of the service provider of a user to the client identifier for that same user. The ID mapping database 222 can store multiple instances of mapping information 220 for multiple different users, which is collectively referred to as an identifier mapping 224.

Some service providers may utilize different service identifiers and/or different domains for the different services. In these situations, the process that is performed above can be combined with additional processes, as desired, to extend the cookie mapping while continuing to protect user privacy by preventing the linking of the different service identifiers to the same client identifier. For example, when the combination of the client identifier and the service identifier are received by the service apparatus 110, the service apparatus 110 can determine whether the user is currently signed in to a service provided by the service apparatus 110.

If the user is currently signed in to a service (e.g., a video streaming service) provided by the service apparatus 110, the service apparatus 110 can identify the account identifier for the user's account with the service. Using this account identifier, the service apparatus 110 can identify another different service identifier (different from the service identifier received from the client device 106 based on the pixel firing) that has been assigned to the user for another service (e.g., a search service) provided by the service provider. For example, the service apparatus 110 can search an index of account identifiers and corresponding service identifiers for the other service (e.g., the search service), and identify the different service identifier that has been assigned to the user for that other service. The service apparatus 110 can then use the client identifier and the different service identifier to create a mapping, e.g., in a different database, between the client identifier and the different service identifier in a manner similar to that described above. In this way, the service apparatus 110 can carry out the operations discussed throughout this document across two different identifier spaces (e.g., cookie spaces) by way of the single pixel firing on the publisher resource, which is in a different identifier space (e.g., cookie space than either of the services provided by the service provider.

To further protect user privacy in this cross-identifier-space (e.g., cross-cookie-space) implementation, a different hash function (or seed) can be used when hashing the client identifier that is assigned to the user by the publisher 206. For example, instead of using the same hash of the client identifier discussed above, the service apparatus 110 can create a different hash of the client identifier using a different hash function (or seed) so that the first mapping of the client identifier and the first service identifier (e.g., of a first service) is different from (and not directly attributable to) the second mapping of the client identifier to the second service identifier. More specifically, the first mapping for the first service can be, for example, SID1=hash1(PID1:CID1), and the second mapping for the second service can be, for example, SID2=hash2(PID1:CID1) so that it is not apparent that SID1 and SID2 are assigned to the same user. A similar process can be done across any number of identifier spaces so as to link the client identifier to the corresponding service identifier in each identifier space (e.g., for each service), while ensuring that the entries in the different mappings are not attributable to each other.

In some situations, users may access services of the service provider (e.g., the service apparatus 110) using multiple different devices. For example, a user may first access a particular service using their mobile device, then access the same service using a digital assistant device, and then access the same service using a tablet device. In this example, each device will have a different service identifier that is stored at the device. In order to protect user privacy, the service apparatus 110 can be configured to keep only the mapping for the most recently encountered service identifier.

Continuing with the example above, assume that the service apparatus 110 first maps the service identifier stored at the mobile device to the client identifier, e.g., in the manner described above. Further assume, at a later time, the service apparatus 110 receives the client identifier from the tablet device along with the client identifier (e.g., due to the pixel firing). In this situation, the service apparatus 110 can delete the mapping of the client identifier to the service identifier that was created using the service identifier obtained from the mobile device, thereby eliminating that earlier received service identifier from the identifier mapping 224. However, the service apparatus 110 can create a new mapping of the second service identifier (e.g., the service identifier received from the tablet device) to the client identifier assigned to the user by the publisher 206, and store that mapping in the list of mappings 224, in a manner similar to that discussed above. In this way, the service apparatus 110 further enhances user privacy by reducing the number of identifiers that are attributable to the same user, which limits the amount of information that is attributable to a particular user.

In some implementations, one or more additional apparatus (not shown) may receive the network call 216, and redirect the client device 106 to the service apparatus 110. For example, the pixel 210 may initiate the network call 216 to a server that tracks conversions (or other analytics data). In this example, the server that tracks conversions can log the conversion identified in the network call 216 and pass the client identifier and/or publisher identifier to the service apparatus 110 in a redirect. The server that tracks conversions can also pass the service identifier to the service apparatus 110 (e.g., if the additional apparatus belongs to the same domain as the service apparatus 110). Alternatively, and/or additionally, when the redirect from the additional apparatus is executed by the client device 106, the browser will identify the service cookie[s] and pass them along with the information from the network call 216 that is embedded in the redirect initiated by the additional apparatus.

Figure 2B:
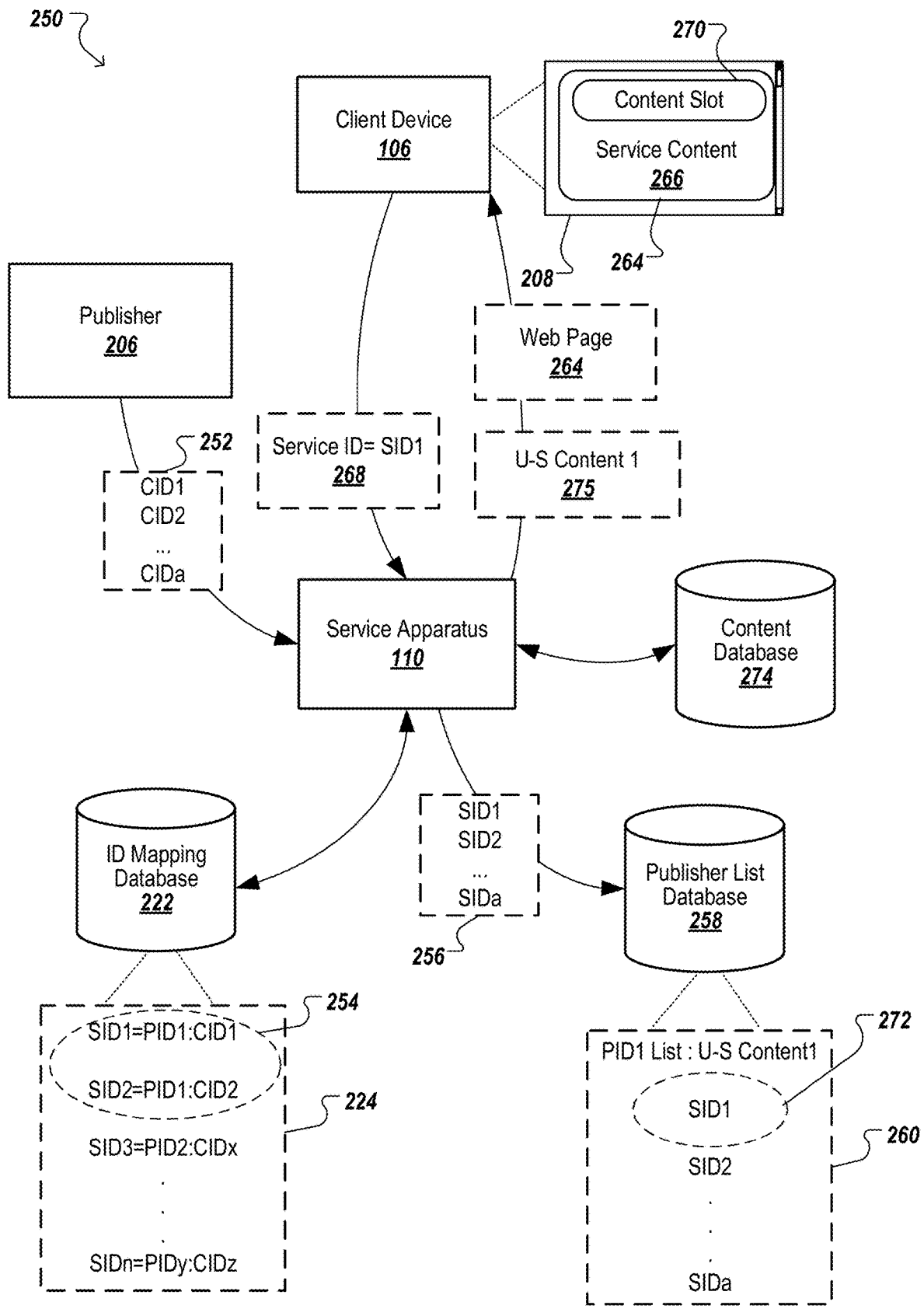
FIG. 2B is a block diagram illustrating an example technique for enhancing user privacy in a cross-domain environment.

FIG. 2B is a block diagram 250 illustrating an example technique for enhancing user privacy in a cross-domain environment. The technique illustrated by the block diagram 250 can be carried out using (e.g., after creating) the identifier mapping 224 discussed with reference to FIG. 2A. Furthermore, the technique illustrated by the block diagram 250 enables the service apparatus 110 to facilitate the delivery (e.g., distribution or transmission) of user-specific information to a list of users specified by the publisher 206 (e.g., by way of client identifiers) when those users are accessing a service provided by the service apparatus 110 (e.g., when the client identifiers are not provided to the service apparatus 110 by the client device 106).

As discussed above, a publisher 206 can specify that user-specific information (e.g., remarketing content) be provided to a specified list of users. In some situations, the publisher 206 may want that user-specific information provided to the specified set of users when those users access (or otherwise utilize) services provided by the service apparatus 110 (or another third-party service provider) outside of the domain of the publisher. To facilitate the ability of the service apparatus 110 to distribute (or transmit) the user-specific information to the users selected by the publisher 206, the publisher 206 can provide, to the service apparatus 110, a list of client identifiers 252 representing users that the publisher has selected to be the recipients of user-specific information. The list of client identifiers 252 specifies one or more client identifiers that have been assigned to corresponding user[s] by the publisher 206. The client identifiers in the list can be assigned to the users when the users first visit a resource provided from the domain of the publisher (e.g., any web page of a publisher website). Additionally, or alternatively, the client identifiers list can be assigned to the users when those users visit a specific resource provided by the publisher (e.g., a specific page within the publisher's website). The client identifiers can be stored on client devices 106 of the users, for example, in a cookie that is only accessible by devices (e.g., servers) that have network addresses within the publisher's domain.

After the service apparatus 110 receives the list of client identifiers 252, the service apparatus 110 can use the identifier mapping 224 to determine whether a service identifier has been assigned to each user represented by the client identifiers in the list of client identifiers 252. In some implementations, the service apparatus 110 can perform a lookup (or search) of the identifier mapping 224 in an effort to identify an entry in the identifier mapping 224 that matches each particular client identifier included in the list of client identifiers 252. For example, the service apparatus 110 can compare each client identifier in the list of client identifiers to the client identifier in each entry of the identifier mapping 224. In the present example, the service apparatus 110 will determine that the identifier mapping 224 includes a set of entries 254 that include client identifiers (e.g., CID1, CID2) that match identifiers in the list of client identifiers 252.

When the service apparatus 110 determines that an entry in the identifier mapping 224 matches one of the client identifiers in the list of client identifiers 252 (e.g., by way of a compare function, query function, or another function), the service apparatus 110 can identify the given service identifier that is included in the entry containing the matched client identifier. As discussed above, the inclusion of a given service identifier in a same entry of the identifier mapping 224 indicates that the given service identifier represents (e.g., is assigned to) a same user that is represented by (e.g., assigned) the client identifier in that entry. As such, the service apparatus 110 can add the service identifier (but not the client identifier) to a list of matched service identifiers 256 that is stored in a publisher list database 258. In this way, the service apparatus 110 can generate a set of service identifiers that represent the users identified by the publisher using the client identifiers. This set of service identifiers enables the service apparatus 110 to use the service identifiers alone (e.g., without the client identifiers) to determine whether a given user that is accessing services of the service apparatus 110 is a user that the publisher has specified should receive user-specific information (e.g., by way of the client identifiers).

In some implementations, the publisher list database 258 stores a data structure 260 that includes the list of matched identifiers 256. The data structure 260 can also include information identifying the publisher (e.g., the publisher ID, PID1) that submitted the client identifiers used to create the list of matched identifiers 256. The data structure 260 can also include information identifying the user-specified content (e.g., U-S Content 1) that the publisher has specified should be delivered to the users specified by the publisher. Note that the publisher list database can store different data structures for multiple different publishers, so as to be able to provide user-specific information to multiple different user lists provided by multiple different publishers.

When a client device 106 accesses services provided by the service apparatus 110, or otherwise submits a request to the service apparatus 110 (e.g., to any resource that belongs to the same domain as the service apparatus 110), the client device 106 will submit, to the service apparatus 110, the service identifier that was assigned to the user by the service apparatus 110. For example, as discussed above, if the user is accessing a web site provided by the service apparatus (e.g., in the same second-level domain as the apparatus, such as google.com), a browser executing at the client device 106 will provide the service apparatus 110 with any cookies that belong to the domain (e.g., second level domain) of the service apparatus 110.

In a specific example, as illustrated by FIG. 2B, the client device 106 contacts the service apparatus 110 to access the web page 264 that is hosted in the domain of the service apparatus 110, and includes service content 266. When the client device 106 requests the web page 264, the browser 208 will submit, to the service apparatus 110, the service identifier 268 (e.g., as part of a cookie file) that was assigned to the user by the service apparatus 110.

The service apparatus 110 responds to the request for the web page by providing the web page 264, which includes the service content 266. In some implementations, the service content is a user interface for a search system. In these situations, the user can submit a search query to the service apparatus 110, and the service apparatus can respond with service content 266 in the form of a search results page. The search results page can include a content slot 270 that is reserved for presentation of third-party content (e.g., digital components) that differs from the search results.

The service apparatus 110 can select third-party content that populates the content slot 270 based, in part, on whether the service identifier 268 for the user is included in the publisher list database 258. For example, the service apparatus 110 can do a lookup (or query) of the publisher list database 258 to determine whether the service identifier 268 obtained from the client device 106 is included in data structure 260 for a publisher. More specifically, the service apparatus 110 can query the publisher list database 258 using the service identifier 268. When the query returns a match in a data structure 260 stored in the publisher list database 258, the service apparatus 110 can transmit content specified by the data structure 260 to the client device 106.

For instance, when the service apparatus 110 queries the publisher list database 258 using the service identifier 268, the query result can be an indication that a matching service identifier 272 is included in the data structure 260 for the publisher having the publisher identifier of PID1. In other words, the response to the query can be an indication that the client device has provided a service identifier that is included in the list of matched service identifiers for a publisher.

In response to the identification of a matching service identifier 272, the service apparatus can transmit content reserved for (e.g., specified for) the users that are represented by the service identifiers in the data structure 260, U-S Content 1 275 in this example. For example, the service apparatus 110 can either retrieve U-S Content 1 275 from a content database 274 and transmit the retrieved content to the client device 106 for presentation in the content slot 270, or the service apparatus 110 can transmit a network address of U-S Content 1 275 to the user device 106, and the user device can retrieve U-S Content 1 275 from the network address. In the present example, the reserved content is the user-specific information U-S Content 1 275.

When the query fails to return an indication that the publisher list database 258 includes a matching service identifier 272, which is an indication that the client device did not provide a service identifier that is included in the list of matched service identifiers provided by a publisher, the service apparatus 110 can either not provide any content to populate the content slot 270, or the service apparatus 110 can provide content that is not reserved for (or specifically specified) for users represented by the lists of matched service identifiers. In the present example, the user-specific information U-S Content 1 275 will not be provided to the client device in this situation.

The description above refers to determining whether the service identifier 268 is included in the data structure 260 for the publisher having the publisher identifier of PID1 for purposes of example. In some implementations, each service identifier is used as an index key for determining all of the publisher lists that include the user. For example, the data structure 260 can include a mapping of publisher identifiers (e.g., PID) and corresponding content to the service identifier, which enables a direct lookup of all publisher lists that include the user, and the corresponding content that is to be distributed to users on each list, using the service identifier 268.

More specifically, assume that the data structure 260 includes the following mapping SID1→PID1:U-S Content 1, PID2:U-S Content 2, PID3:U-S Content 3. In this example, the service apparatus 110 can use the received service identifier SID1 as the query parameter for searching the publisher list database 258 and/or data structure 260. The response to the query would be a list of publisher identifiers corresponding to publisher lists that include the service identifier SID1, and the corresponding content that has been specified to be provided to users in the publisher lists. This response is also considered an indication that the client device has provided a service identifier that is included in the list of matched service identifiers for a publisher (or multiple publishers). The service apparatus 110 can use this list of publisher identifiers and corresponding content to determine which content will actually be transmitted to the client device 106. For example, the service apparatus can perform a content selection process similar to that described with reference to FIG. 1.

In the examples above, the service provided by the service apparatus 110 is referred to as a search service, but the service could be any service. For example, the service could be a music streaming service with the content slot being a time slot for presentation of third-party content. The service could also be an email service, a social media service, a digital assistant service, a video streaming service, another online media service, a shopping service, an advertising service, or any other service offered online.

In some implementations, the content and/or services may be provided by a third-party that differs from each of the publisher whose content is ultimately provided and the service apparatus 110. In these situations, a similar process can be used when the service apparatus 110 is providing a service within the content and/or service provided by the third-party. For example, if the third-party content includes a pixel or script that generates an HTTP request to the service apparatus 110, the browser (or application) initiating the HTTP request can provide the service identifier 272 to the service apparatus 110, and the service apparatus 110 can utilize the service identifier 272 in a manner similar to that described above to select content that will be presented at the client device 106 with the third-party content or service.

Figure 3:
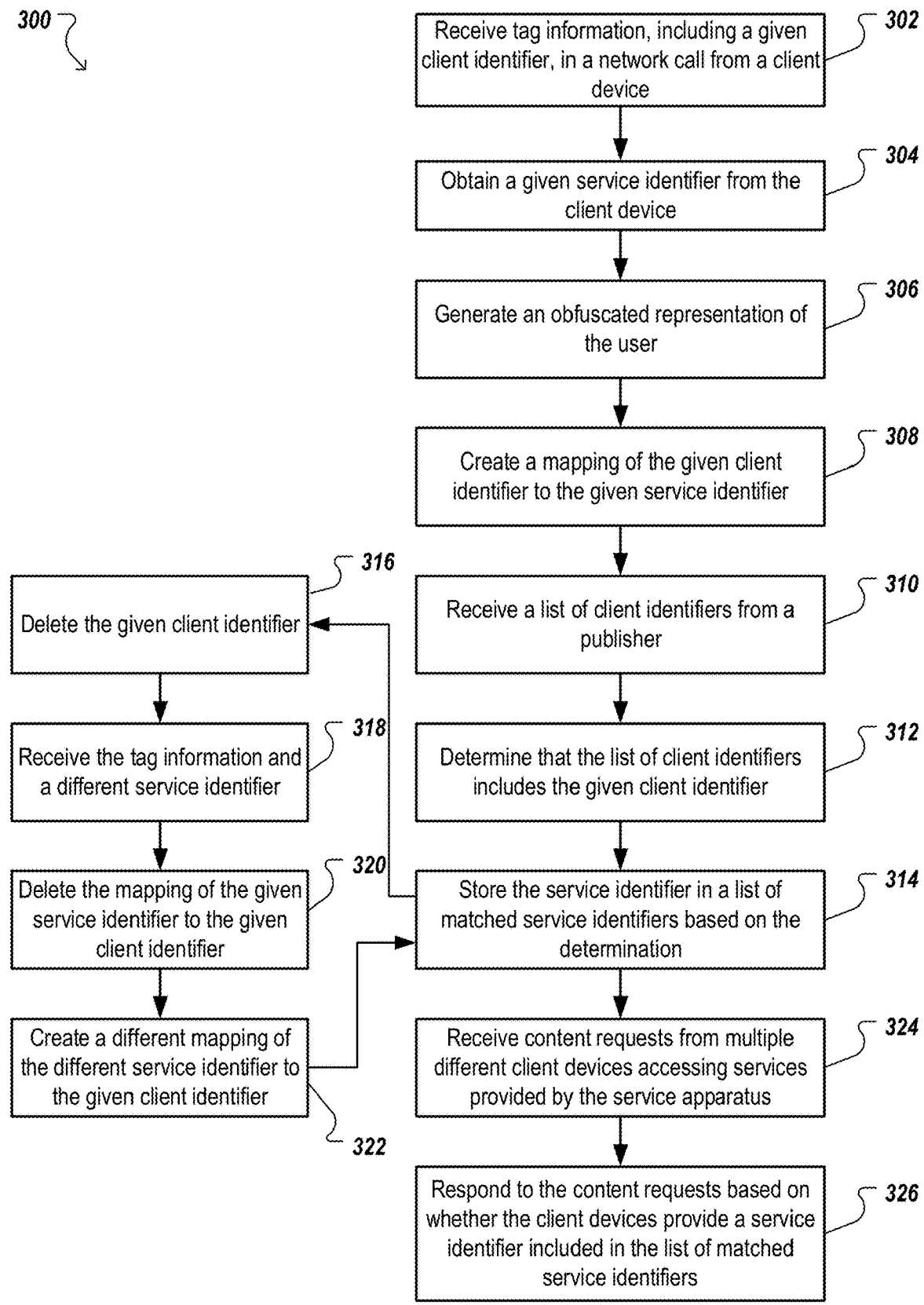
FIG. 3 is a flow chart of an example process for enhancing user privacy in a cross-domain content distribution environment.

FIG. 3 is a flow chart of an example process 300 for enhancing user privacy in a cross-domain content distribution environment. The process 300 can be performed by one or more data processing apparatus, such as the service apparatus 110 discussed above. The process can also be implemented as instructions stored on a non-transitory computer readable medium. The instructions can be executed by one or more data processing apparatus. Execution of the instructions can cause the one or more data processing apparatus to perform operations of the process 300.

Tag information is received in a network call from a client device (302). In some implementations, the network call that includes the tag information is generated by firing of a tag (e.g., pixel) that was embedded in a publisher resource. For example, when the client device renders the publisher resource, the client device will execute the tag, thereby firing the tag, which generates the network call that delivers the tag information to the service apparatus. In some implementations, the tag information includes a given publisher identifier for the publisher of the publisher resource and a given client identifier assigned to a user of the client device by the publisher. The given publisher identifier can uniquely identify the publisher, while the given client identifier can uniquely identify the user within the domain of the publisher.

A given service identifier is obtained from the client device (304). The given service identifier is an identifier that is assigned to the user by the service apparatus. In some implementations, the given service identifier uniquely identifies the user relative to other users within the domain of the service provider. The given service identifier can be obtained, for example, by way of a cookie that was dropped on the client device by the service apparatus.

For example, prior to the client device encountering the tag at the publisher resource, the client device may have accessed a service provided by the service provider. In this example, a cookie including the given service identifier could have been dropped on the client device by the service apparatus. When the tag fires at the client device and submits the network call to the service apparatus, a browser (or other application) executing at the client device can identify the domain of the service apparatus (e.g., from the tag or network call), use that domain to identify the cookie whose domain matches that of the service apparatus, and submit that cookie, which can include the given service identifier, to the service apparatus.

An obfuscated representation of the user is generated (306). An obfuscated representation of the user can be any representation of the user that helps prevent the user's identify from being directly determined by the representation. One technique used in obfuscating representations of users is hashing. In some implementations, the representation of the user is obfuscated by hashing the given client identifier that was assigned to the user by the publisher. However, it is possible that two different publishers may have assigned the same client identifier to the same user, such that the same hash value may end up representing the same user in two different publisher domains (e.g., in two different cookie spaces). To reduce the likelihood (e.g., prevent) a single user being represented by the same hash value in two different domains, the obfuscation of the representation of the user can be a hash of a combination of the given client identifier and the publisher identifier of the publisher that assigned the given client identifier to the user, as discussed above.

In a specific example, the hash representation of the user can be generated in the following manner. The given publisher identifier of the publisher (e.g., as indicated in the tag information) can be combined with the given client identifier (e.g., as indicated in the tag information). The combination can be performed in various ways, but in one example, the combination can be a concatenation of the given publisher identifier and the given client identifier. The combination of the given publisher identifier and the given client identifier can then have a hash function applied to it, resulting in the generation of a hash of the combination. This hash of the combination can serve as the hash representation of the user, otherwise referred to as the obfuscated representation of the user.

A mapping of the given client identifier to the given service identifier is created (308). In some implementations, the mapping is created in a data structure that is stored in a database, as discussed above. For example, the service apparatus can create an entry in the data structure that links, associates, or otherwise indicates that the given client identifier and the given service identifier represent a same user.

As discussed above, the service apparatus may assign different service identifiers to a same user when the service apparatus offers multiple services. For example, a service apparatus that offers an online search service may assign a particular user a first service identifier for use with that search service. Meanwhile, if the service apparatus also offers an online video streaming service, the service apparatus may assign that same particular user a different service identifier for use with the video streaming service. In this example, the particular user has two different service identifiers that were assigned to the user by the service apparatus, but the user may be able to access both of these services using the same account identifier, e.g., by way of using the same login credentials to access both services.

In some implementations, the service apparatus can extend the mapping of the client identifier to different service identifiers, e.g., used for different services of the service apparatus. For example, assume that the user is currently logged in to a service (e.g., a video streaming service) offered by the service apparatus when the tag information is received from the client device (e.g., when the user visits the publisher resource). In this example, the service apparatus can identify the account identifier of the user, and use the account identifier to identify other service identifiers in other services (e.g., in other cookie spaces) that the service apparatus has assigned to the user. For example, the service apparatus can use the account identifier to search a mapping of account identifiers to service identifiers in databases associated with the other services. When a match between the account identifier and the mapping of account identifiers to service identifiers is found in the databases of the other services, the service apparatus can proceed to identify a different service identifier that has been assigned to the user for a different service provided by the service apparatus. A different mapping between the client identifier and the different service identifier can then be created in a manner similar to that discussed above.

Mapping the client identifier to the various different service identifiers that the service apparatus has assigned to the user for various different services enables the service apparatus to carry out the transmission of user-specific information to a set of users specified by a publisher (e.g., using client identifiers assigned to the users by the publisher) across the various different services offered by the service apparatus even though the different services do not share a common user identifier space (e.g., cookie space).

When the mapping of the client identifier to service identifiers is extended to other cookie spaces, e.g., for other services offered by the service apparatus, additional privacy enhancing techniques can be used to ensure that the information from the different cookie spaces can't be aggregated and attributed to the same user. For example, the given client identifier (e.g., a single client identifier received in the tag information) that was assigned to the user by the publisher can be hashed using different hash functions (or seeds) for each different cookie space (e.g., for each service provided by the service apparatus).

In a particular example, assume that the publisher assigned client identifier for a particular user is CID1, and that the user is signed in to a particular service offered by the service apparatus. In this example, the given client identifier (or a combination of the given client identifier and publisher identifier) can be hashed using a first hash function (or seed) to obtain a first hash value, which is then mapped to the service identifier for the particular service. Continuing with this example, before the given client identifier is mapped to a different service identifier of a different service provided by the service apparatus, the given client identifier (or a combination of the given client identifier and the publisher identifier) can be hashed using a second hash function (or seed) to obtain a second hash value that differs from the first hash value, but represents the same user as the first hash value. A mapping of the second hash value to the different service identifier can be created so that the user corresponding to the given client identifier can be identified within the context of the different service, and provided the user-specific information specified by the publisher.

In some implementations, the service apparatus may assign multiple different service identifiers to the same user in other contexts. For example, the same user may access the same service at different times, where the same user is logged in during one visit, and not logged in during another visit. In this situation, the service apparatus may assign that same user two different service identifiers. In this example, one of the service identifiers will represent the user when logged in and the other service identifier will represent the user when logged out. Similar mapping extensions to those discussed above can also be used in these situations.

A list of client identifiers is received from a publisher (310). In some implementations, the list of client identifiers is received by way of an API that enables the publisher to upload the client identifiers to the service apparatus. The list of client identifiers includes client identifiers that have been assigned to various users by the publisher. The list of client identifiers represent users that the publisher has picked to receive user-specific information (e.g., remarketing content) specified by the publisher when these users access services provided by the service apparatus (e.g., in a different domain and/or cookie space than the publisher). In some implementations, the list of client identifiers represent users that have performed some specific action at the publisher's website (or other properties), as discussed above.

A determination is made that the list of client identifiers supplied by the publisher includes the given client identifier (312). The determination that the list of client identifiers includes the given client identifier can be made by comparing the list of client identifiers with the mapping of service identifiers to client identifiers (e.g., the identifier mapping discussed above). In some implementations, each client identifier in the list of client identifiers (or the combination of the publisher identifier and each client identifier) is hashed in the same manner as the representations of users in the mapping, as discussed above. The hashed versions of the client identifiers is then compared to the representations of the client identifiers in the mapping. When a match between the representation of the given client identifier (e.g., its hashed representation) is found, the determination is made that the given client identifier is included in the list of client identifiers. Note that the same procedure can be followed for each client identifier in the list, and a determination of all client identifiers that match an entry in the mapping can be made. Also note that reference to a mapping of a client identifier to a service identifier, or vice versa, contemplates the mapping between any representation (e.g., original, hashed or otherwise) of the client identifier and/or the service identifier.

The service identifier that is mapped to the given client identifier is stored in a list of matched service identifiers (314). In some implementations, the service identifier is stored in the list of matched service identifiers based on the determination that the given client identifier is included in the list of client identifiers received from the publisher. The list of matched service identifiers is a new/different representation of the list of client identifiers that were received from the publisher. That is, the list of matched service identifiers use service identifiers assigned to users by the service apparatus to represent users specified by the publisher using client identifiers that were assigned to those users by the publisher. This enables the identification of the users specified by the publisher within the services offered by the service apparatus (e.g., in a different domain and/or cookie space than the publisher). As such, the list of matched service identifiers can be used to ensure that the users specified by the publisher receive the user-specific information when the users are accessing the services provided by the service provider. Note that this procedure can be performed for every client identifier in the list of client identifiers, so as to create a list of multiple service identifiers that represent the users corresponding to the list of client identifiers. This can also be performed for multiple different publishers. As discussed above, the mappings can be mappings between a single instance of a service identifier and all pairs of publisher identifiers for lists that include the service identifier and corresponding content that has been specified for distribution to users in the lists that include the service identifier. This facilitates a direct lookup of user-specific content that has been specified for distribution to this user by multiple different publishers. This reduces the amount of time required to identify the various content that should be considered for distribution to the user, thereby improving the performance of the system itself (e.g., reducing latency of selecting content).

Once the service identifier that is mapped to the given client identifier has been stored in the list of matched service identifiers, the given client identifier can be deleted (316). In some implementations, the given client identifier is deleted from the service apparatus in order to further protect user privacy, for example, by limiting possible distribution of that client identifier.

In some situations, the tag information that includes the given publisher identifier and the given client identifier may be received with a different service identifier (318). For example, assume that the user first accesses the publisher resource using a mobile device, and later accesses the publisher resource using a tablet device, as discussed above. In this situation, the service identifier assigned to the user will differ on a per-device basis. However, the given client identifier and the given publisher identifier may be the same. In this situation, only one instance of the service identifier may be mapped to the given client identifier. In some implementations, the mapping of the given service identifier to the given client identifier is deleted (320), and a different mapping of the different service identifier to the given client identifier is created in a manner similar to that described above (322). This particular solution opts to keep a mapping between the most recently received service identifier, thereby discarding the older service identifier. Of course, the older service identifier (and the original mapping) could be retained, while either deleting later mappings, or refraining from creating later mappings. When a new/different mapping replaces an existing mapping for which the service identifier is already included in the list of matched service identifiers, the different service identifier can be stored in the list of matched service identifiers (314).

In some implementations, when a new service identifier replaces an older (or different) service identifier that represents the same user, mapping modifications can be made so that the mappings of the publisher identifier(s) and corresponding content are maintained without requiring further action on the publisher's part. For example, assume that SID1a is assigned to the user that has already been assigned SID1. In this situation, existing associations between SID1 and publisher identifiers (e.g., PID1 and/or any other PIDs), can be remapped to SID1a. In this example, the resulting mapping can replace the existing mapping, such that the publisher need not take any further action to ensure that the user remains eligible for distribution of user-specific content that the user was already eligible to receive (e.g., by way of being included in lists of client identifiers previously specified by the publisher). In this way, the system is able to persist associations between lists of client identifiers, publisher identifiers, and service identifiers even when the originally assigned service identifier changes.

Content requests are received from multiple different client devices that are accessing services provided by the service apparatus (324). In some implementations, the content requests are component requests, as discussed with reference to FIG. 1. The content requests can be requests for third-party content to be delivered to the client device for incorporation into a portion of a display (or user interface)

at the client device. In some situations, the incorporation of the third-party content into the portion of the display (or user interface) can occur at the client. In some situations, the third-party content can be incorporated at the service apparatus, and delivered along with content of the service provided by the service apparatus. In some situations, a content request is not required in order to deliver content within the service provided by the service apparatus. For example, the service apparatus can insert third-party content into the service prior to, or at a time when, the user accesses the service. In this situation, a separate content request is not required.

The content requests are responded to based on whether the client devices provide a service identifier that is included in the list of matched service identifiers (326). For example, when the client device provides a corresponding service identifier that is included in the list of matched service identifiers, first content reserved for (e.g., specified for) users specified by the publisher can be transmitted to the client device. For example, assume that the publisher has specified particular content (e.g., an image, message, or video) be provided to users represented by the list of client identifiers uploaded by the publisher. In this situation, the corresponding service identifiers for those users will be included in the list of matched service identifiers, and the particular content can be transmitted (or otherwise distributed to) the client device based on the client device having submitted a service identifier that is included in the list of service identifiers. The user-specific information can be delivered while the user is accessing a service provided by the service apparatus, such that the content is presented while the user is accessing a different second level domain than the domain of the publisher.

When the client device does not provide the corresponding service identifier that is included in the list of matched service identifiers, different content that is not reserved for the list of matched identifiers is transmitted to the client device. The different content can be any content that is otherwise available for distribution to the client device, e.g., based on one or more factors discussed with reference to FIG. 1. In some implementations, no third-party content will be provided for presentation with the service being accessed by the user when the client device does not provide the corresponding service identifier that is included in the list of matched service providers.

Figure 4:
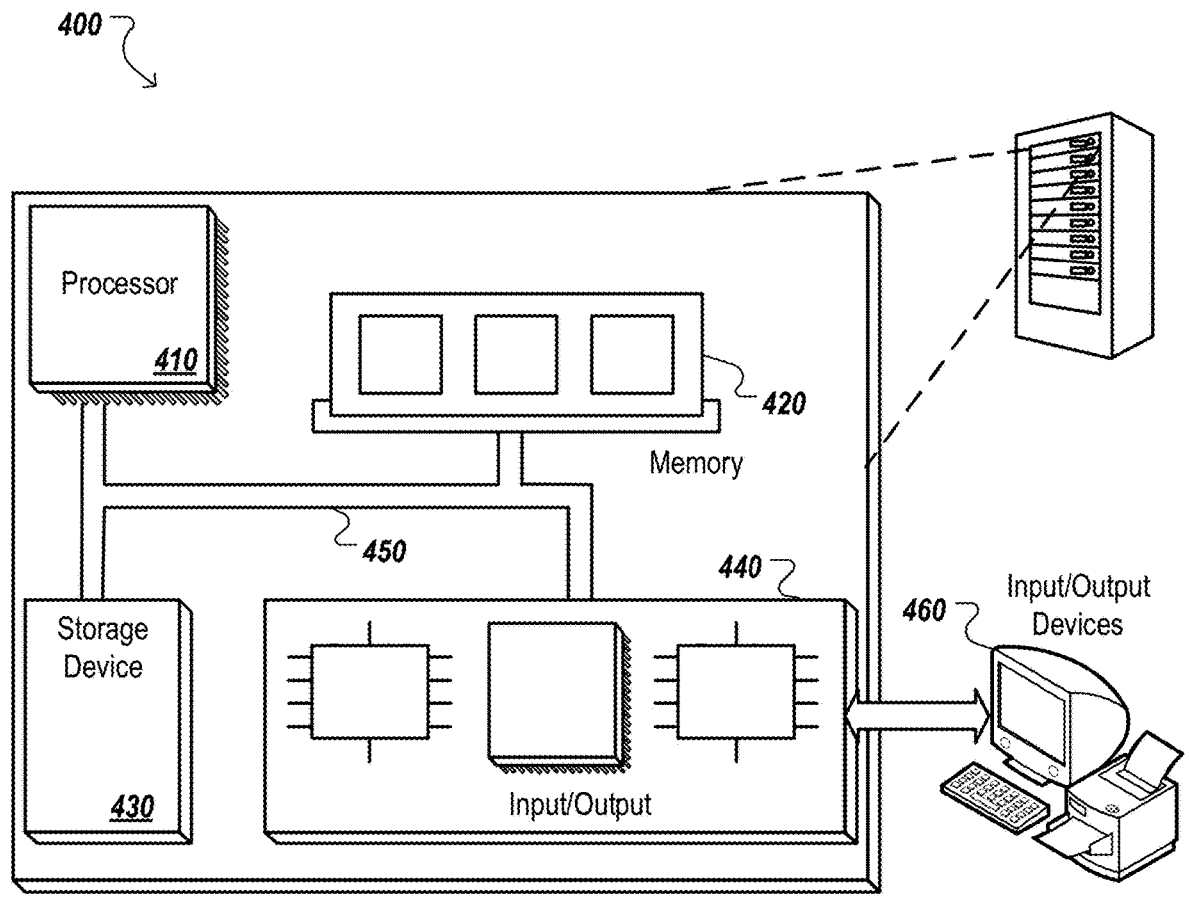
FIG. 4 is block diagram of an example computer system.

FIG. 4 is block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In one implementation, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 360. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

An electronic document (which for brevity will simply be referred to as a document) does not necessarily correspond to a file. A document may be stored in a portion of a file that holds other documents, in a single file dedicated to the document in question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML, page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
assigning, to a client device and by a service apparatus, a given service identifier that uniquely represents the user in a service domain of the service apparatus;
receiving, by a service apparatus and from a client device, tag information in a network call to the service apparatus that was generated by firing of a tag embedded in a resource of a publisher, the tag information specifying a given publisher identifier for the publisher and a client identifier that is (i) assigned to a user of the client device by the publisher and (ii) uniquely represents the user of the client device in a publisher domain of the publisher, wherein the service domain differs from the publisher domain, and the given service identifier assigned by the service apparatus differs from the client identifier assigned by the publisher;
creating, by the service apparatus and in a data structure, a mapping of the given service identifier to the client identifier;
receiving, from the publisher and by way of an application programming interface (API), a list of client identifiers that have been (i) assigned to a set of users by the publisher and (ii) uniquely represent each user in the set of users in the publisher domain;
determining that the list of client identifiers received from the publisher includes the client identifier that (i) was received in the tag information, (ii) is mapped to the given service identifier in the data structure, and (iii) uniquely represents the user of the client device in the publisher domain;
storing, by the service apparatus, the given service identifier that is mapped to the client identifier in a list of matched service identifiers based on the determination that the list of client identifiers includes the given client identifier;
receiving, by the service apparatus, multiple content requests from multiple different client devices accessing services provided by the service apparatus in the service domain; and
responding to the content requests based on whether the client devices provide service identifiers that are included in the list of matched service identifiers, including:
transmitting first content reserved for the set of users that are assigned a client identifier in the list of client identifiers a corresponding service identifier that is included in the list of matched service identifiers; and
transmitting second content that is not reserved for the set of users that are assigned a client identifier in the list of client identifiers in response to the content request not including the corresponding service identifier that is included in the list of matched service identifiers.

2. The method of claim 1, further comprising:
generating a hash representation of the user, including:
combining the given publisher identifier and the client identifier; and
generating a hash of the combination of the publisher identifier and the client identifier, wherein:
creating a mapping of the given service identifier to the client identifier comprises mapping the hash representation of the user to the given service identifier.

3. The method of claim 1, further comprising:
determining that the user is logged into a given service provided by the service apparatus;
identifying an account identifier for the user based on the service that the user is logged into;
identifying, using the account identifier, a different service identifier that is assigned to the user for a different service provided by the service apparatus; and
creating a different mapping between the client identifier and the different service identifier.

4. The method of claim 3, wherein:
creating a mapping of the given service identifier to the client identifier comprises creating a mapping of the given service identifier to a first hash value created using the client identifier and a first hash function or seed; and
creating a different mapping between the client identifier and the different service identifier comprises creating a mapping of the different service identifier to a second hash value created using the client identifier and a second hash function or seed, wherein the second hash value differs from the first hash value.

5. The method of claim 1, further comprising:
receiving, from a different client device, the tag information and a different service identifier;
deleting, from the data structure, the mapping of the given service identifier to the client identifier; and
creating, in the data structure, a different mapping of the different service identifier to the client identifier.

6. The method of claim 5, wherein storing the given service identifier that is mapped to the client identifier in a list of matched service identifiers comprises storing the given service identifier in a data structure entry with a set of publisher identifier—content pairs that specify publisher identifiers of publisher lists that include the client identifier and user-specific content that is to be distributed to users in the publisher lists, the method further comprising:
updating the list of matched service identifiers in response to determining that the user has been assigned the different service identifier, including remapping, to the different identifier, existing associations between the given service identifier and the set of publisher identifier—content pairs.

7. The method of claim 1, further comprising after storing the given service identifier that is mapped to the client identifier in a list of mapped service identifiers, deleting the client identifier.

8. The method of claim 1, wherein transmitting first content reserved for the set of users that are assigned the list of client identifiers when the client device provides a corresponding service identifier that is included in the list of mapped service identifiers comprises presenting the first content while the user is accessing a service provided in a different second level domain than a domain of the publisher.

9. A system, comprising:
one or more memory devices storing instructions; and
one or more data processing apparatus that are configured to interact with the one or more memory devices, and upon execution of the instructions, perform operations including:
   assigning, to a client device and by a service apparatus, a given service identifier that uniquely represents the user in a service domain of the service apparatus;
   receiving, from a client device, tag information in a network call to the service apparatus that was generated by firing of a tag embedded in a resource of a publisher, the tag information specifying a given publisher identifier for the publisher and a client identifier that is (i) assigned to a user of the client device by the publisher and (ii) uniquely represents the user of the client device in a publisher domain of the publisher, wherein the service domain differs from the publisher domain, and the given service identifier assigned by the service apparatus differs from the client identifier assigned by the publisher;
   creating, in a data structure, a mapping of the given service identifier to the client identifier;
   receiving, from the publisher and by way of an application programming interface (API), a list of client identifiers that have been (i) assigned to a set of users by the publisher and (ii) uniquely represent each user in the set of users in the publisher domain;
   determining that the list of client identifiers received from the publisher includes the client identifier that (i) was received in the tag information, (ii) is mapped to the given service identifier in the data structure, and (iii) uniquely represents the user of the client device in the publisher domain;
   storing the given service identifier that is mapped to the client identifier in a list of matched service identifiers based on the determination that the list of client identifiers includes the given client identifier;
   receiving multiple content requests from multiple different client devices accessing services provided by the service apparatus in the service domain; and
   responding to the content requests based on whether the client devices provide service identifiers that are included in the list of matched service identifiers, including:
      transmitting first content reserved for the set of users that are assigned a client identifier in the list of client identifiers a corresponding service identifier that is included in the list of matched service identifiers; and
      transmitting second content that is not reserved for the set of users that are assigned a client identifier in the list of client identifiers in response to the content request not including the corresponding service identifier that is included in the list of matched service identifiers.

10. The system of claim 9, wherein the one or more data processing apparatus are configured to perform operations further comprising:
   generating a hash representation of the user, including:
      combining the given publisher identifier and the client identifier; and
      generating a hash of the combination of the publisher identifier and the client identifier, wherein:
   creating a mapping of the given service identifier to the client identifier comprises mapping the hash representation of the user to the given service identifier.

11. The system of claim 9, wherein the one or more data processing apparatus are configured to perform operations further comprising:
   determining that the user is logged into a given service provided by the service apparatus;
   identifying an account identifier for the user based on the service that the user is logged into;
   identifying, using the account identifier, a different service identifier that is assigned to the user for a different service provided by the service apparatus; and
   creating a different mapping between the client identifier and the different service identifier.

12. The system of claim 11, wherein:
   creating a mapping of the given service identifier to the client identifier comprises creating a mapping of the given service identifier to a first hash value created using the client identifier and a first hash function or seed; and
   creating a different mapping between the client identifier and the different service identifier comprises creating a mapping of the different service identifier to a second hash value created using the client identifier and a second hash function or seed, wherein the second hash value differs from the first hash value.

13. The system of claim 9, wherein the one or more data processing apparatus are configured to perform operations further comprising:
   receiving, from a different client device, the tag information and a different service identifier;
   deleting, from the data structure, the mapping of the given service identifier to the client identifier; and
   creating, in the data structure, a different mapping of the different service identifier to the client identifier.

14. The system of claim 13, wherein storing the given service identifier that is mapped to the client identifier in a list of matched service identifiers comprises storing the given service identifier in a data structure entry with a set of publisher identifier content pairs that specify publisher identifiers of publisher lists that include the client identifier and user-specific content that is to be distributed to users in the publisher lists, the method further comprising:
   updating the list of matched service identifiers in response to determining that the user has been assigned the different service identifier, including remapping, to the different identifier, existing associations between the given service identifier and the set of publisher identifier—content pairs.

15. The system of claim 9, wherein the one or more data processing apparatus are configured to perform operations further comprising after storing the given service identifier that is mapped to the client identifier in a list of mapped service identifiers, deleting the client identifier.

16. The system of claim 9, wherein transmitting first content reserved for the set of users that are assigned the list of client identifiers when the client device provides a corresponding service identifier that is included in the list of mapped service identifiers comprises presenting the first content while the user is accessing a service provided in a different second level domain than a domain of the publisher.

17. A non-transitory computer readable medium storing instructions that, when executed by one or more data processing apparatus, cause the one or more data processing apparatus to perform operations comprising:
   assigning, to a client device and by a service apparatus, a given service identifier that uniquely represents the user in a service domain of the service apparatus;

receiving, from a client device, tag information in a network call to the service apparatus that was generated by firing of a tag embedded in a resource of a publisher, the tag information specifying a given publisher identifier for the publisher and a client identifier that is (i) assigned to a user of the client device by the publisher and (ii) uniquely represents the user of the client device in a publisher domain of the publisher, wherein the service domain differs from the publisher domain, and the given service identifier assigned by the service apparatus differs from the client identifier assigned by the publisher;

creating, in a data structure, a mapping of the given service identifier to the client identifier;

receiving, from the publisher and by way of an application programming interface (API), a list of client identifiers that have been (i) assigned to a set of users by the publisher and (ii) uniquely represent each user in the set of users in the publisher domain;

determining that the list of client identifiers received from the publisher includes the client identifier that (i) was received in the tag information, (ii) is mapped to the given service identifier in the data structure, and (iii) uniquely represents the user of the client device in the publisher domain;

storing the given service identifier that is mapped to the client identifier in a list of matched service identifiers based on the determination that the list of client identifiers includes the given client identifier;

receiving multiple content requests from multiple different client devices accessing services provided by the service apparatus in the service domain; and responding to the content requests based on whether the client devices provide service identifiers that are included in the list of matched service identifiers, including:
transmitting first content reserved for the set of users that are assigned a client identifier in the list of client identifiers a corresponding service identifier that is included in the list of matched service identifiers; and
transmitting second content that is not reserved for the set of users that are assigned a client identifier in the list of client identifiers in response to the content request not including the corresponding service identifier that is included in the list of matched service identifiers.

18. The non-transitory computer readable medium of claim 17, wherein the instructions cause the one or more data processing apparatus to perform operations comprising:
generating a hash representation of the user, including:
combining the given publisher identifier and the client identifier; and
generating a hash of the combination of the publisher identifier and the client identifier, wherein:
creating a mapping of the given service identifier to the client identifier comprises mapping the hash representation of the user to the given service identifier.

19. The non-transitory computer readable medium of claim 17, wherein the instructions cause the one or more data processing apparatus to perform operations comprising:
determining that the user is logged into a given service provided by the service apparatus;
identifying an account identifier for the user based on the service that the user is logged into;
identifying, using the account identifier, a different service identifier that is assigned to the user for a different service provided by the service apparatus; and
creating a different mapping between the client identifier and the different service identifier.

20. The non-transitory computer readable medium of claim 19, wherein:
creating a mapping of the given service identifier to the client identifier comprises creating a mapping of the given service identifier to a first hash value created using the client identifier and a first hash function or seed; and
creating a different mapping between the client identifier and the different service identifier comprises creating a mapping of the different service identifier to a second hash value created using the client identifier and a second hash function or seed, wherein the second hash value differs from the first hash value.

* * * * *